United States Patent
Sakada

(10) Patent No.: US 9,842,009 B2
(45) Date of Patent: *Dec. 12, 2017

(54) METHOD AND DEVICE FOR DETECTING A RACE CONDITION AND A COMPUTER PROGRAM PRODUCT

(71) Applicant: Oleksandr Sakada, Munich (DE)

(72) Inventor: Oleksandr Sakada, Munich (DE)

(73) Assignee: NXP USA, Inc., Austin, TX (US)

(*) Notice: Subject to any disclaimer, the term of this patent is extended or adjusted under 35 U.S.C. 154(b) by 130 days.

This patent is subject to a terminal disclaimer.

(21) Appl. No.: 14/785,634

(22) PCT Filed: May 13, 2013

(86) PCT No.: PCT/IB2013/053880
§ 371 (c)(1),
(2) Date: Oct. 20, 2015

(87) PCT Pub. No.: WO2014/184612
PCT Pub. Date: Nov. 20, 2014

(65) Prior Publication Data
US 2016/0062806 A1    Mar. 3, 2016

(51) Int. Cl.
*G06F 12/00* (2006.01)
*G06F 9/52* (2006.01)
*G06F 11/07* (2006.01)
*G06F 11/36* (2006.01)

(52) U.S. Cl.
CPC ........... *G06F 9/52* (2013.01); *G06F 9/524* (2013.01); *G06F 11/0715* (2013.01); *G06F 11/362* (2013.01)

(58) Field of Classification Search
CPC .. G06F 9/3009; G06F 11/362; G06F 11/0715; G06F 11/0751; G06F 9/30094
See application file for complete search history.

(56) References Cited

U.S. PATENT DOCUMENTS

| | | | |
|---|---|---|---|
| 6,009,269 A * | 12/1999 | Burrows | ............... G06F 9/524 |
| | | | 714/38.1 |
| 6,851,075 B2 | 2/2005 | Ur et al. | |
| 9,395,987 B2 * | 7/2016 | Sakada | ............. G06F 11/0715 |
| 2003/0056149 A1 | 3/2003 | Hue | |
| 2005/0138583 A1 | 6/2005 | Ouyang | |
| 2005/0216798 A1 | 9/2005 | Yu | |
| 2005/0283780 A1 * | 12/2005 | Karp | ................... G06F 9/3004 |
| | | | 718/100 |

(Continued)

OTHER PUBLICATIONS

International Search Report and Written Opinion correlating to PCT/IB2013/053880 dated Jan. 29, 2014.

*Primary Examiner* — David X Yi
*Assistant Examiner* — Francisco Grullon

(57) ABSTRACT

A method is provided for detecting a race condition of a parallel task when accessing a shared resource in a multi-core processing system. The method requires that a core requires only a read access to the data set of another core, thereby ensuring better decoupling of the tasks. In an initialisation phase, initial values of global variables are assigned, in an activation phase, each core determines if the other core has written new values to the variables and if so, detects a race condition. Initial values are restored for each variable in a deactivation phase.

8 Claims, 4 Drawing Sheets

(56) References Cited

U.S. PATENT DOCUMENTS

| | | | |
|---|---|---|---|
| 2005/0283781 A1* | 12/2005 | Karp | G06F 11/3624 718/100 |
| 2006/0053422 A1 | 3/2006 | Alikacem et al. | |
| 2007/0245312 A1* | 10/2007 | Qadeer | G06F 11/3632 717/124 |
| 2008/0109641 A1 | 5/2008 | Ball et al. | |
| 2008/0162776 A1 | 7/2008 | Krauss | |
| 2009/0328019 A1 | 12/2009 | Detlefs et al. | |
| 2011/0041015 A1 | 2/2011 | Grove et al. | |
| 2013/0185524 A1 | 7/2013 | Sakada | |

* cited by examiner

METHOD AND DEVICE FOR DETECTING A RACE CONDITION AND A COMPUTER PROGRAM PRODUCT

FIELD OF THE INVENTION

This invention relates to a method and a device for detecting a race condition and a computer program product.

BACKGROUND OF THE INVENTION

Modern processing devices for executing software code often support multithreaded approaches, in which a single program is split into at least two separate threads that are executed independently. It is also possible that the processing device comprises more than one processing units, each unit having one or more cores for executing code. In this case, the separate threads can be independently executed in the same time period on different cores. During execution, it is possible that one thread tries to access a shared resource, e. g. a shared memory or an I/O-device, which is already accessed by another thread. This situation is called a data race or race condition and results when a shared resource is accessed by two or more concurrent threads without proper synchronisation to constrain the ordering of the accesses, and at least one of the accesses is a write operation. This means that the results of the threads may vary depending on the access sequence. Such behaviour is normally unwanted, and in order to avoid race conditions, many processing devices support synchronisation primitives such as semaphores in their hardware. The implementation of synchronisation primitives is usually available within an Operating System or dedicated libraries and is supported by dedicated hardware mechanisms.

For example, U.S. Pat. No. 7,757,237 B2 describes the synchronisation of threads in a multithreaded computer program using a dedicated hardware table that is updated with addresses of shared variables upon execution of load/store instructions. EP 1 591 895 A2 describes a method based on maintaining a virtual clock by each thread and thread segments. A method based on the comparison of the variable content with a local copy is shown in U.S. Pat. No. 7,366,965 B2, and a method using a compiler configured to generate code with a software transactional memory system is known from US 20090328019 A1. U.S. Pat. No. 7,549,150 B2 extends a classic hardware-based lockset approach for reporting fewer false positives in the fork and join context. In addition to the dynamic approach described above, there are also other approaches to prevent a race condition at mission time or run time. U.S. Pat. No. 7,243,319 B2 uses a static analysis of hardware circuits to detect race conditions. The detection of race conditions using a test suite during software testing phase is known from U.S. Pat. No. 6,851,075 B2, and US 20080109641 A1 describes a method for defining a set of tests which can be used for testing the program in the software testing phase. A method for detection of code deficiencies, such as potential race conditions, is given in US 20060053422 A1. EP 0864975 A2 describes a process wherein a sequence of lock acquire and lock release commands is analysed to record state information of locking order for detecting locking conditions. Applicant's co-pending application WO 2010/038780 A1 describes a method which comprises storing a seed value to a first global variable D; identifying a race condition when a second global variable A does not equal a first predefined value, storing a second predefined value to the second global variable A, identifying a race condition when the first global variable D does not equal the seed value; accessing a shared resource, and storing the first predefined variable V1 to the second global variable A. This known method requires write access to a common memory from multiple concurrent tasks.

SUMMARY OF THE INVENTION

The present invention provides a method and device for detecting a race condition and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
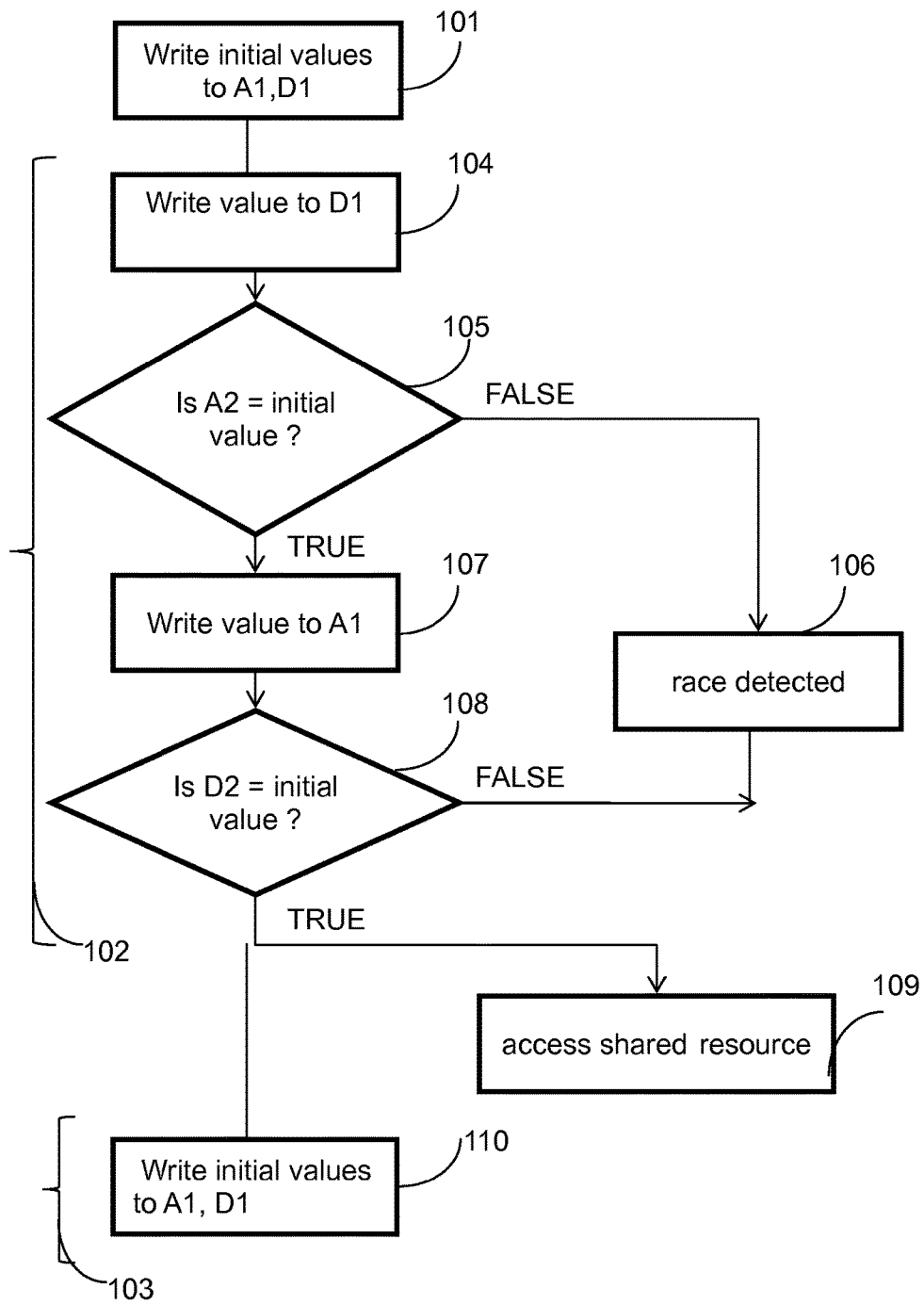
FIG. 1 schematically shows a flow chart of an embodiment of a method for detecting race conditions.

Because the illustrated embodiments of the present invention may for the most part be implemented using computer systems and software known to those skilled in the art, details will not be explained in any greater extent than that considered necessary as illustrated above, for the understanding and appreciation of the underlying concepts of the present invention and in order not to obfuscate or distract from the teachings of the present invention.

In the context of this specification, a thread may be a sequence of instructions that may execute in parallel with other threads. A thread may be a part of a computer program.

A shared resource may be a resource that can be accessed by different threads, for example a memory location or an I/O-device.

A race condition may be when a function is invoked simultaneously from different cores, causing a function to act in such a way that corrupts the accessed shared resource. It may be, for example, a state during the execution of a program when two or more different threads concurrently access a shared resource, for example a memory location, without synchronisation. At least one of these accesses may comprise storing/writing to the memory location. A value or content of an accessed memory location and a result based on this value or content may depend on an access sequence for the different threads, but, without synchronisation, this access sequence may vary if the situation is repeated. Another example of a race condition occurring is when access to a resource, which is protected with a corresponding synchronization primitive, is attempted but due to a fault, the synchronization primitive does not work correctly A global variable is a variable that is visible and accessible from every scope, for example, different routines, procedures, functions, subroutines or modules, in a computer program.

A Boolean may be a variable with a logical value, for example, true or false.

An initiation event may be the start of the execution of a computer program, for example, an init or reset state.

A predefined value may be a value that is constant during execution of a computer program and initialised once at the beginning of the execution.

A seed value may be a value that is unique and could be used for identifying a specific thread.

Storing may be the writing of a value to a memory location, wherein the memory location can be of any granularity, for example byte, half-word, or word.

A byte, a half-word, and a word may be a memory location of a specific size.

A shared resource may be a resource that is used by different threads simultaneously. A resource may be a memory location or an external device.

Accessing a resource may be the storing of data to the resource or the loading of data from the resource. The storing of data could be described as writing of data, and the loading of data could be described as reading of data. The resource may be a memory location, a DMA (direct memory access) channel, GPIO (general purpose input output), or a Flex-Ray network.

Terminating may be the return to a calling thread which might be interrupted.

Now referring to FIG. 1, a flow chart of an embodiment of a method for detecting race conditions is schematically shown. Reference numeral 100 refers to a method that may be provided as a code portion of an executable computer program. The exemplary method may not require write access to common global variables but instead, may replace this requirement with two copies of variables, one copy per core (for example, D1 and A1 for a first core and D2 and A2 for a second core) in the case of a two-core processing unit, and having write access to only the core-specific instance of variables and read access to the instance of variables of another core. In one embodiment, a shared memory partition is read-accessible only from both cores of a processing unit. As a result, the exemplary method does not introduce any safety-related weaknesses into any associated safety architecture nor does it require any additional safety measures.

The exemplary method 100 of FIG. 1 is depicted as comprising three parts; initialisation of a safety measure 101, activation of a safety measure 102 and de-activation of a safety measure 103. The exemplary method may be located within a concurrent tasks execution flow whereby, for example, a first task may be performed by one core of a processing unit (having variables D1 and A1 associated therewith) and a second task may be performed by a second core of the processing unit (having variables D2 and A2 associated therewith). For example, each core may require access to a shared resource concurrently. The method ensures that any attempt at simultaneous access by both cores to the shared resource, in the case of failure of a semaphore for example, will be detected.

In an initialisation phase 101, respective, pre-defined initial values may be written to a first global variable D1 and a second global variable A1 both being associated with a first task. Similarly, respective, pre-defined values may be written to a third global variable A2 and a fourth global variable D2 both being associated with a second task.

A safety measure activation phase 102 may be called by a thread as part of a computer program, wherein said thread may want to access a shared resource, for example, a shared memory location, a bus system or an I/O-device. When calling an activation phase 102, the thread may provide a pre-defined value of the first global variable D1 that may be unique and suitable for distinguishing different threads and different from the initial value of D1. At 104, the provided value may be stored or written to the first global variable D1. It may be possible to generate a unique value based on a random number generator. At 105, the value of a third global variable A2 may be compared with an initial value of A2. This may be done by reading the global variable A2. The result of this comparison may be a Boolean having the value true or false. The value of the Boolean may, for example, be used for deciding which branch of the flowchart is to be executed. In one example, if the Boolean is false, then a race condition may be detected at 106. The detected race condition may be reported, by generating a race detected message, for example, and the error may be processed by external software or hardware. At 107, a pre-defined value, different from its initial value, may be stored or written to the second global variable A1 when the value of the Boolean is true. At 108, the value of a fourth global variable D2 may be compared with an initial value of D2. This may be done by reading the variable D2. Again, the resulting Boolean may be used to decide which branch of the flowchart is executed. When the Boolean is false, this may indicate that a race condition has been detected and the process flow may revert to 106. The detected race condition may be reported and the error processed. When the Boolean is true, the shared resource may be accessed safely at 109. In the safety measure deactivation phase 103 the first and second global variables D1, A1 may be restored to their initial values at 110. In some embodiments, the third and fourth global variables A2, D2 may also be restored to their initial values by the second core in a de-activation stage.

It will be noted that the operations 105 and 107 which involve, respectively, reading A2 and comparing it with its initial value and writing a value to A1, may be reversed in sequence.

In one embodiment, de-activation phase 103 may also comprise additional checks of the global variables A1, A2, D1, D2 before they are set to their initial values. If, for example, it was found that one or more of the global variables was still set to its initial value, then this could indicate that the safety measure activation phase 102 had either not been executed correctly or had been omitted because of a fault. Although does not help to prevent simultaneous access to a shared resource, it may help, post factum, to detect such a problem and subsequently, for example, invalidate any result of a computation.

In one example, accessing the shared resource may involve a first safety level approach for preventing race conditions, as it is known in the art, when the method 100 checks this approach.

If all Booleans generated during the operation of the method 100 are true, then this may be used as an indicator to an application that a corresponding hardware solution dispatching accesses to the shared resource works error free. It may also be used as an indicator for other threads calling the method 100 in order to decide whether the shared resource can be accessed safely. The method 100 may terminate with the return to the calling thread. If a Boolean generated during the operation of the method 100 is false, then this may indicate a race condition and the method may terminate without accessing the shared resource because another thread may be trying to access the same resource during the same period.

The exemplary method may be employed to detect one or more race conditions in situations where a race condition avoidance mechanism, for example a synchronisation mechanism such as a semaphore, does not function correctly due to a fault. The exemplary method may be based on a sequence of read and write accesses to a set of global and shared variables from concurrent tasks. Further, the exemplary method may be hardware independent and may permit software tasks to be executed asynchronously on different cores with different speed and with enabled interrupts. It also has applicability to multi-tasking applications running on single-core devices. A "lock semaphore" operation may be performed between the initialisation of the safety measure phase and the activation of the safety measure phase. A "free semaphore" operation may be performed after the deactivation of the safety measure.

The exemplary method may be completely executed in software, and it may not be necessary to have dedicated hardware support for detecting or avoiding race conditions, for example, by synchronisation with hardware primitives such as semaphores when using the method. The exemplary method 100 may allow the detection of a race condition in situations where a dedicated hardware support for avoiding race conditions may not work correctly due to a hardware defect or fault, and it may be used as an independent second safety level to check whether the hardware solution (the first safety level) for avoiding race conditions is working correctly. It may be implemented in addition to hardware primitives to check at runtime whether the hardware primitives work correctly. This possibility results from the property of a hardware solution for avoiding race conditions, as a race condition does not occur as long as the hardware solution works correctly. The hardware solution, for example, semaphores, may decide whether a shared resource can be accessed safely. It may dispatch the accesses to the shared resource, making the access safe. When the hardware solution works correctly, it may lock an execution of a second thread accessing a "busy" shared resource or may ask it to wait until the shared resource is free again and a race condition will not occur. For example, the method 100 may only detect a race condition when the hardware solution shows a fault, and the corresponding hardware primitive or synchronisation primitive may work incorrectly.

The exemplary method 100 may also be used with any solution for preventing race conditions which works as a first safety level, for example, semaphores implemented partially in hardware and partially in software or implemented fully in software. Any solution used together with the exemplary method 100 as a first safety level solution may be implemented in hardware, partially in hardware and partially in software, or fully in software. It may be normal to detect race conditions for all solutions working as a first safety level because they solve detected race conditions, for example, by synchronisation of accesses on runtime. Detecting a race condition with the method 100 as a second safety level may be an exceptional event, because of a fault/error in the first safety level.

The exemplary method may be based on a property of memory controllers to sequentially perform accesses to a memory location which are initiated simultaneously from different cores. The exemplary method 100 may be used with memory locations of any granularity, for example byte half-word, or word, for the global variables. A memory controller which performs non-sequential accesses to a memory location may, nevertheless, be used. When the method does not detect a race condition, the method may perform three write memory accesses, two read memory accesses for loading the global variables for the comparisons and two comparisons. The method 100 may not lead to any limitations on concurrent execution of different threads. Different threads may be asynchronously executed on different cores with different speeds and also with enabled interrupts. The method 100 may, for example, apply to multi-tasking applications running on devices with a single core processing unit or a multi core processing unit.

It may be possible to generate a race detected message at 106. The generated message may be used to inform the program about the faulty/defective behaviour in order to avoid further propagation of the fault or defect. The message may lead to a disabling of the shared resource due to a hardware fault, for example, in the synchronisation primitives or in the software code. Such a race detected message may be sent to the calling thread and/or any other appropriate receiver, for example, another thread accessing the shared resource. The other thread accessing the shared resource may be identified using the unique seed value that may, for example, be provided by the thread calling the method. The message may be sent directly after its generation or when terminating the exemplary method 100. It may also be used for an exception handling process. This may be useful when the exemplary method 100 is used as a wrapper for controlling the access to the shared resource, for example, a global variable or a buffer. This may provide an interface, for example, a functional API (application program interface) for accessing the shared resource and performing checks against race conditions when accessing this shared resource. A simple exception handling strategy may be to let the thread that was not allowed to access the shared resource call the method again after detecting a race condition. When the other thread that initially interfered with the thread has finished the access to the shared resource, the thread which was initially not allowed may now be able to access the shared resource.

It may be possible to use the exemplary method 100 with different shared resources, wherein different instances of the exemplary method 100 may be generated, namely one instance for each shared resource. In this case, each instance may have its own global variables.

Figure 2:
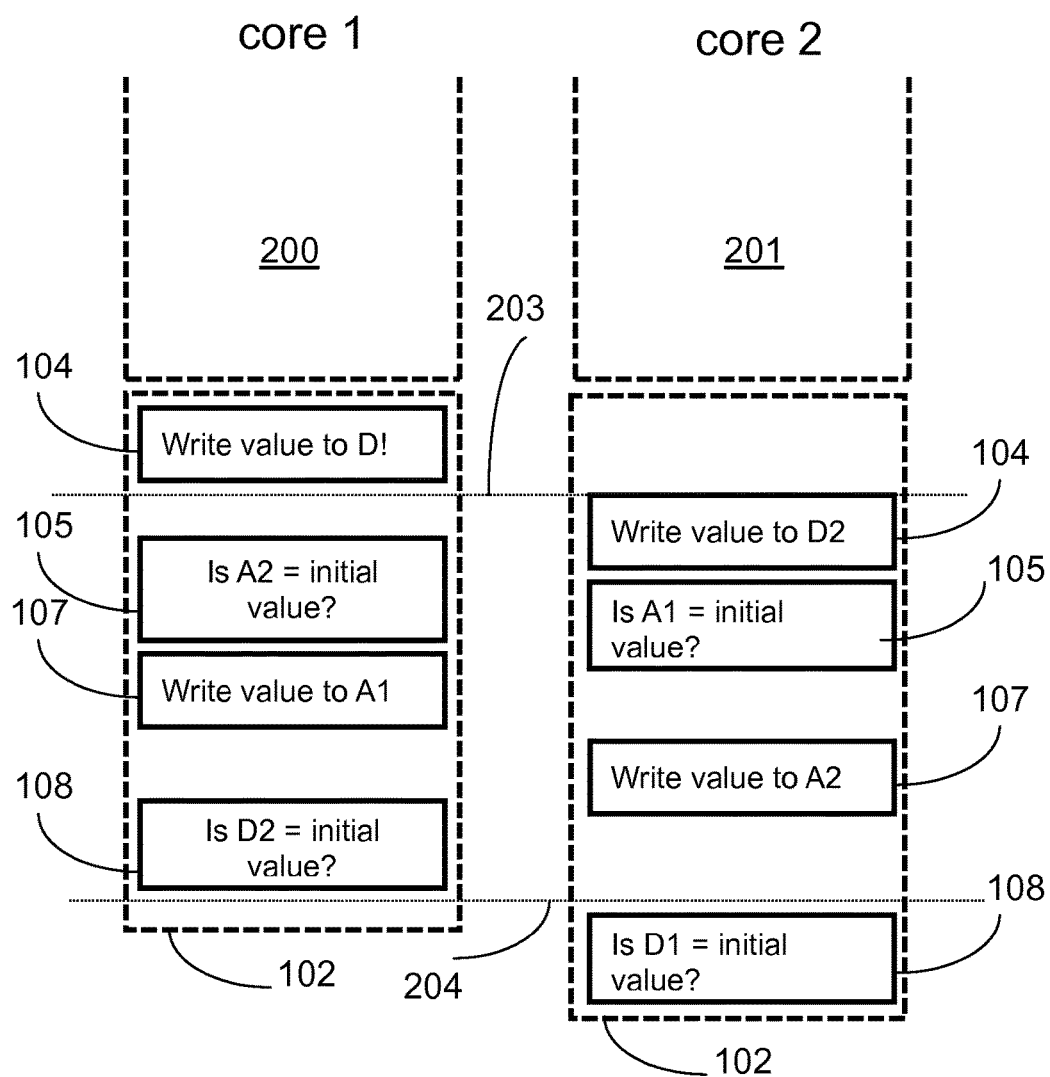
FIG. 2 shows a first example of a working principle of an embodiment of a method for detecting race conditions.

FIG. 2 shows a first example of a working principle of an embodiment of a method for detecting race conditions. The left side of FIG. 2 shows a part of an execution pipeline of a first core 1 and the right side of FIG. 2 shows a part of an execution pipeline of a second core 2. The first core 1 and the second core 2 may be part of a single processing unit or part of different processing units. A first operation on the left side and a second operation on the right side that are illustrated on the same height may be executed simultaneously by the first core 1 and the second core 2. The first core 1 may execute a first thread 200 while the second core 2 may execute a second thread 201. The method 100 may correspond to the embodiment as shown in FIG. 1 and may, for example, comprise the safety measure activation phase 102 as described in connection with FIG. 1 and comprising 104, 105, 107 and 108. The method as executed by the first core 1 may have completed writing a value to D1 at a time 203 while at the same time, the method as executed by the core 2 may commence the safety measure activation phase and subsequently write a value to D2. This might be the case even if both cores 1,2 start the method 100 at the same time. At time 204, the method as executed by the first core 1 may have read the value for D2 and executed a comparison with its initial value. The result of the comparison in this example may be false since a value has been written to D2, at 104. Thus the method as executed by the first core 1 may detect a race condition at 108 and may skip accessing the shared resource and may report and process an error.

Figure 3:
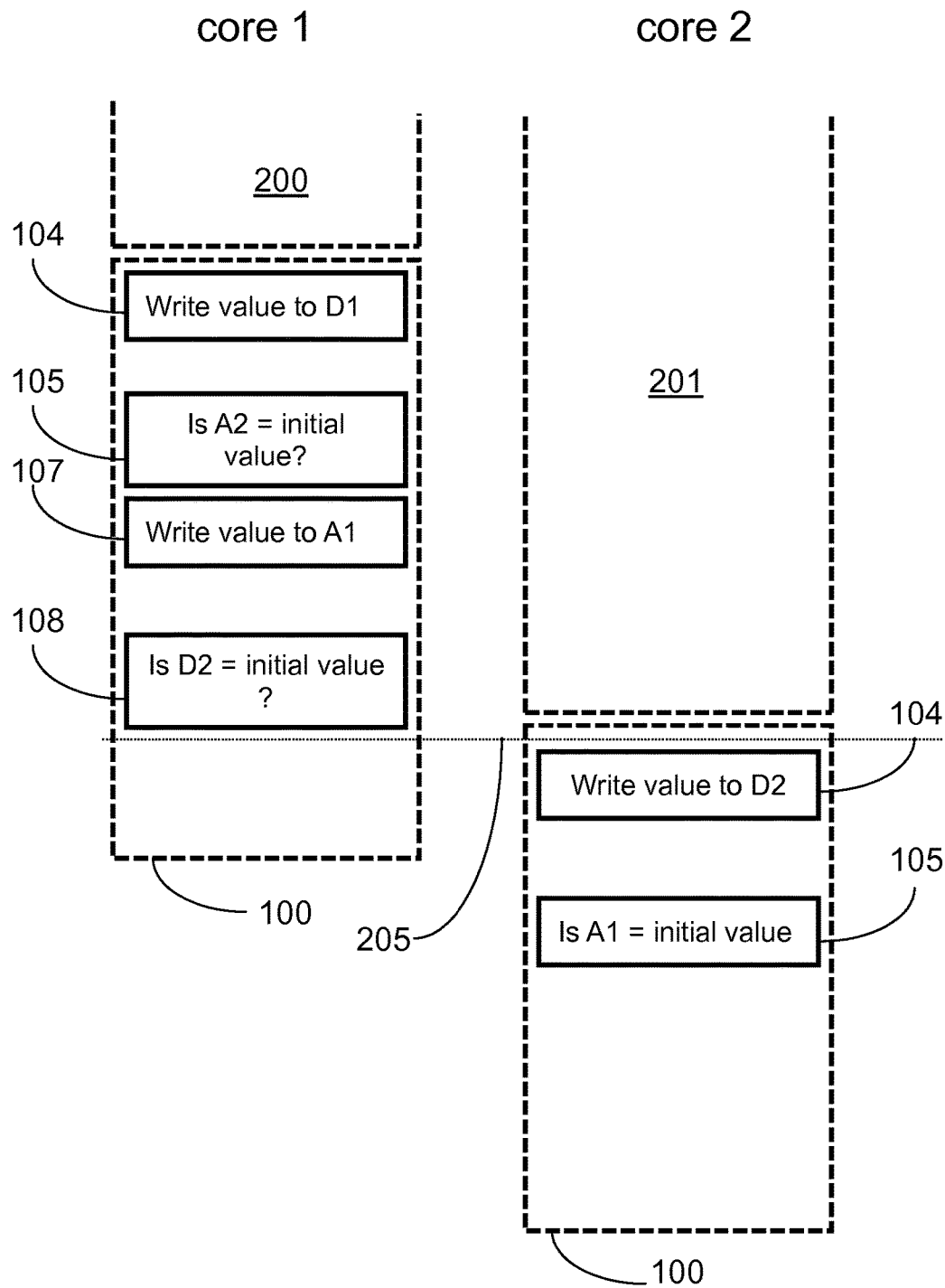
FIG. 3 shows a second example of a working principle of an embodiment of a method for detecting race conditions.

FIG. 3 shows a second example of a working principle of an embodiment of a method for detecting race conditions. FIG. 3 shows the same components as FIG. 2 but with different timing for the execution of the method 100. The second thread 201 may call the method 100 for access to the shared resource at time 205 after the first core 1 has completed the safety measure activation phase and proceeded to access the shared resource but not yet de-activated the safety measure. A comparison of A1 with its initial value by the second core 2 may indicate a race condition because a value has previously been written to A1. The second core 2 on detecting a race condition, may skip steps 107 and 108 and may also skip accessing the shared resource due to the detected race condition. The detected race condition may be reported and an error processed.

Figure 4:
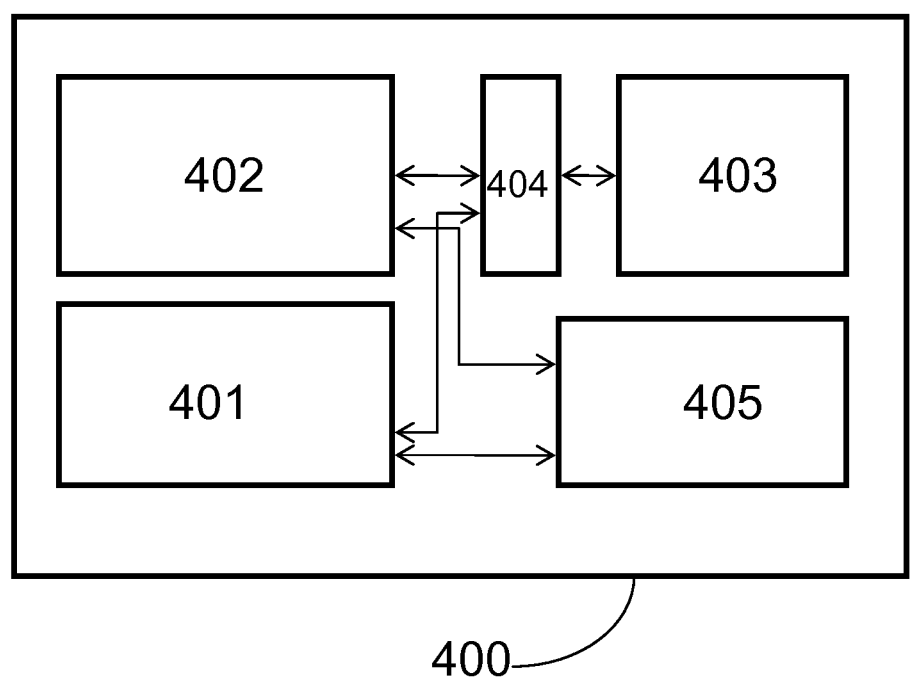
FIG. 4 schematically shows an example of a device arranged to detect race conditions.

FIG. 4 schematically shows an example of a device arranged to execute a method for detecting race conditions. The device 400 may be arranged to execute an embodiment of the method 100 as illustrated, for example, in FIG. 1. The device 400 may comprise a first processing unit 401, such as a microprocessor or a MCU (microcontroller unit) comprising a first core 1, and a second processing unit 402, for example, another microprocessor or another MCU comprising a second core 2. The first processing unit 401 and the second processing unit 402 may indirectly access a shared resource 403, for example, a shared memory location via a memory controller 404. The processing units 401, 402 may also directly access a further shared resource 405, for example a DMA channel or an I/O-device. The shared resource 403, the further shared resource 404, and the memory controller 404 may be part of the device 400. The memory controller 404 may always perform accesses to memory locations in the shared resource 403 sequentially or non-sequentially (i.e. simultaneously, which may be a worst-case scenario causing data interference. The memory controller may execute the access, one after the other, when the first processing unit 401 and the second processing unit 402 try to access the same memory location, The processing unit 402, 403 may be arranged to generate a race detected message and/or terminate when a race condition is identified.

While the embodiments have been described in the context of a two-core processing system, it will be understood that the invention is also applicable to multi-core systems. This may involve writing additional initial global variables and reading A and D values of each additional core in the system. In such cases, a separate set of variables A and D may be maintained for each core. This obviates any need to create a shared memory write accessible capability from all cores. A shared memory, write-accessible capability from multiple cores, can, in fact, be considered in some applications or systems to be a safety deficiency. In an example of a three-core system, three pairs of variables A and D may be created, for example, (A1,D1,A2,D2,A3,D3), one pair belonging to each core and being write-accessible only from the corresponding core. The other two pairs would be only read-accessed from the given core to check whether their initial value had been changed by other cores (indicating a start of accessing a shared resource) or not. Referring again to FIG. 1, for a three core system, the exemplary method illustrated could be modified such that; at step 105, an additional comparison between A3 and its initial value may be made. If either A2 or A3 are different from their respective initial values, then a race condition may be detected. Similarly, at step 108, an additional comparison between D3 and its initial value may be made. If either D2 or D3 are different from their respective initial values, then a race condition may be detected.

A safety critical system may comprise a device 400.

A computer-readable storage medium may store code representing the device 400 and/or code to perform a method as described with reference to FIGS. 1, 2 and/or 3.

A computer program product may comprise code portions for executing steps of a method for detecting a race condition or for implementing parts of a device 400 when run on a programmable apparatus.

The invention may also be implemented in a computer program for running on a computer system, at least including code portions for performing steps of a method according to the invention when run on a programmable apparatus, such as a computer system or enabling a programmable apparatus to perform functions of a device or system according to the invention. As an example, a tangible computer program product may be provided having executable code stored therein to perform a method for detecting a race condition.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product which may comprise a computer readable storage medium or be transmitted to the computer system via a computer readable transmission medium. All or some of the computer program may be provided on computer readable media permanently, removably or remotely coupled to an information processing system. The computer program product may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the method may be implemented in a computer program as a function, a subroutine, and a module and the device may be part of or integrated in an embedded system, a computer system or a safety critical system using processing units.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. An integrated circuit may be a package containing one or more dies in a single package with electronic components provided on the dies that form a module and which are connectable to other components outside the package through suitable connections such as pins of the package and bondwires between the pins and the dies. For example, processing units, memory controller and memory location comprising global variables may be located on the same die. Alternatively, the examples may be implemented as any number of separate integrated circuits or separate devices interconnected with each other in a suitable manner. For example the processing units, memory controller and the memory location comprising global variables are located on different dies or in different devices.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for detecting a race condition, comprising: writing a pre-defined value to a copy of a first global variable D1, wherein the first global variable is write-accessible, in a first processing core; identifying a race condition when a value of a copy of a third global variable A2, wherein the third global variable is read-accessible, in a second processing core does not equal an initial value, writing a value to a copy of a second global variable A1, wherein the second global variable is write-accessible, in the first processing core; identifying a race condition when a value of a copy of a fourth global variable D2, wherein the fourth global variable is read-accessible, in the second processing core does not equal an initial value; accessing a shared resource; and writing an initial value to the copy of the first global variable D1, and writing an initial value to the copy of the second global variable A1.

2. The method of claim 1 further comprising writing initial values to the copies of the first and second global variables D1, A1, prior to writing the pre-defined value to the copy of the first global variable D1.

3. The method of claim 1 further comprising generating a race detected message and/or terminating when a race condition is detected.

4. The method of claim 1 further comprising at least a first thread and a second thread calling the method when accessing the shared resource.

5. A device for detecting a race condition, said device comprising: a processing unit arranged to write a pre-defined value to a copy of a first global variable D1, wherein the first global variable is write-accessible, in a first processing core, identify a race condition when a value of a copy of a third global variable A2, wherein the third global variable is read-accessible, in a second processing core does not equal an initial value; write a value to a copy of a second global variable A1, wherein the second global variable is write-accessible, in the first processing core; identify a race condition when a value of a copy of a fourth global variable $D2$, wherein the fourth global variable is read-accessible, does not equal an initial value; access a shared resource; write an initial value to the copy of the first global variable $D1$, and write an initial value to the copy of the second global variable $A1$.

6. The device of claim 5 wherein the processing unit is further arranged to write initial values to the copies of the first and second global variables $D1$, $A1$, prior to writing the pre-defined value to the copy of the first global variable $D1$.

7. The device of claim 5 wherein the processing unit is further arranged to generate a race detected message and/or terminate when a race condition is identified.

8. The device of claim 5 wherein the device is implemented in an integrated circuit.

* * * * *